(12) United States Patent
Biebach et al.

(10) Patent No.: US 10,392,095 B2
(45) Date of Patent: Aug. 27, 2019

(54) ELECTRIC DRIVE AND EMERGENCY STOP SWITCH FOR BOATS

(71) Applicant: Torqeedo GmbH, Gilching (DE)

(72) Inventors: Jens Biebach, Tutzing (DE); Philipp Krieger, Feldafing (DE); Marc Hartmeyer, Munich (DE)

(73) Assignee: Torqeedo GmbH, Gilching (DE)

( * ) Notice: Subject to any disclaimer, the term of this patent is extended or adjusted under 35 U.S.C. 154(b) by 0 days.

(21) Appl. No.: 15/703,902

(22) Filed: Sep. 13, 2017

(65) Prior Publication Data
US 2018/0001987 A1 Jan. 4, 2018

Related U.S. Application Data

(63) Continuation of application No. 14/442,062, filed as application No. PCT/EP2013/003393 on Nov. 11, 2013, now Pat. No. 9,789,946.

(30) Foreign Application Priority Data

Nov. 12, 2012 (DE) ........................ 10 2012 021 996

(51) Int. Cl.
*B63J 3/04* (2006.01)
*B63H 23/24* (2006.01)
(Continued)

(52) U.S. Cl.
CPC .............. *B63J 3/04* (2013.01); *B63H 20/007* (2013.01); *B63H 20/12* (2013.01); *B63H 21/17* (2013.01);
(Continued)

(58) Field of Classification Search
CPC . B63J 3/04; B63H 20/12; B63H 21/17; B63H 21/36; B63H 23/24; B63H 20/07;
(Continued)

(56) References Cited

U.S. PATENT DOCUMENTS 3,989,002 A   11/1976 Peterson
9,789,946 B2 * 10/2017 Biebach ................ B63H 23/24
(Continued)

FOREIGN PATENT DOCUMENTS

CN   1502158 A    6/2004
CN   101106039 A  1/2008
(Continued)

OTHER PUBLICATIONS

PCT/EP2013/003393, International Search Report dated Feb. 26, 2014 (Two (2) pages).
(Continued)

*Primary Examiner* — Robert L Deberadinis
(74) *Attorney, Agent, or Firm* — Crowell & Moring LLP

(57) ABSTRACT

A boat having an electric motor coupled with an electrical store is disclosed. The electrical store includes a storage element, and positive and negative poles in current-conducting connection with the storage element. An isolating circuit element is operatively connected to a user activatable emergency stop switch. The isolating circuit element is configured to, upon activation of the emergency stop switch, isolate the current-conducting connection between the storage element and at least one of the poles.

16 Claims, 4 Drawing Sheets

(51) Int. Cl.
  *B63H 21/17* (2006.01)
  *B63H 21/36* (2006.01)
  *H01M 2/12* (2006.01)
  *H01M 10/0525* (2010.01)
  *B63H 20/12* (2006.01)
  *H01H 47/00* (2006.01)
  *B63H 20/00* (2006.01)

(52) U.S. Cl.
  CPC ............ *B63H 21/36* (2013.01); *B63H 23/24* (2013.01); *H01H 47/00* (2013.01); *H01M 2/1223* (2013.01); *H01M 10/0525* (2013.01); *H01M 2220/20* (2013.01)

(58) Field of Classification Search
  CPC ........... H01M 2/1223; H01M 10/0525; H01M 220/20; H01H 47/00
  See application file for complete search history.

(56) References Cited

U.S. PATENT DOCUMENTS

| | | |
|---|---|---|
| 2008/0048809 A1 | 2/2008 | Narita et al. |
| 2011/0012741 A1 | 1/2011 | Garcia |
| 2011/0104963 A1 | 5/2011 | Ellis et al. |
| 2011/0187376 A1 | 8/2011 | Barrenscheen et al. |
| 2011/0244739 A1 | 10/2011 | Daikoku et al. |

FOREIGN PATENT DOCUMENTS

| | | |
|---|---|---|
| CN | 201049727 Y | 4/2008 |
| CN | 101868911 A | 10/2010 |
| CN | 101911423 A | 12/2010 |
| CN | 102017352 A | 4/2011 |
| CN | 105228896 B | 1/2018 |
| DE | 10 2004 045 897 A1 | 3/2006 |
| EP | 0 015 728 A1 | 9/1980 |
| EP | 0 878 718 A1 | 11/1998 |
| EP | 1 641 066 A2 | 3/2006 |
| EP | 2 330 030 A2 | 6/2011 |
| JP | 9-142388 A | 6/1997 |
| WO | WO 02/14736 A1 | 2/2002 |
| WO | WO 2012/104152 A2 | 8/2012 |
| WO | WO 2014/072070 A1 | 5/2014 |
| WO | WO 2014/072071 A1 | 5/2014 |
| WO | WO 2014/072073 A1 | 5/2014 |
| WO | WO 2014/072074 A1 | 5/2014 |

OTHER PUBLICATIONS

U.S. patent application, "Electrical Accumulator with Water Sensor", U.S. Appl. No. 14/442,047, filed May 11, 2015, First named inventor: Marc Hartmeyer et al.
U.S. patent application, "Boat with High-Voltage System", U.S. Appl. No. 14/442,051, filed May 11, 2015, First named inventor: Jens Biebach et al.
U.S. patent application, "Boat with Electric Drive", U.S. Appl. No. 14/442,056, filed May 11, 2015, First named inventor: Jens Biebach et al.
U.S. patent application, "Boat with Electric Drive", U.S. Appl. No. 14/442,058, filed May 11, 2015, First named inventor: Jens Biebach et al.
Chinese Office Action issued in Chinese counterpart application No. 201380058904.3 dated Oct. 31, 2016, with partial English translation (Seventeen (17) pages).
European Issue Notification issued in European counterpart application No. 13 798 927.3-1015 dated Mar. 14, 2018 (Seven (7) pages).
Chinese Office Action issued in Chinese counterpart application No. 201711184857.3 dated Nov. 13, 2018, with English translation (Twenty (20) pages).
Chinese Office Action issued in Chinese counterpart application No. 201711184857.3 dated May 30, 2019, with English translation (Eighteen (18) pages).

* cited by examiner

Fig. 1
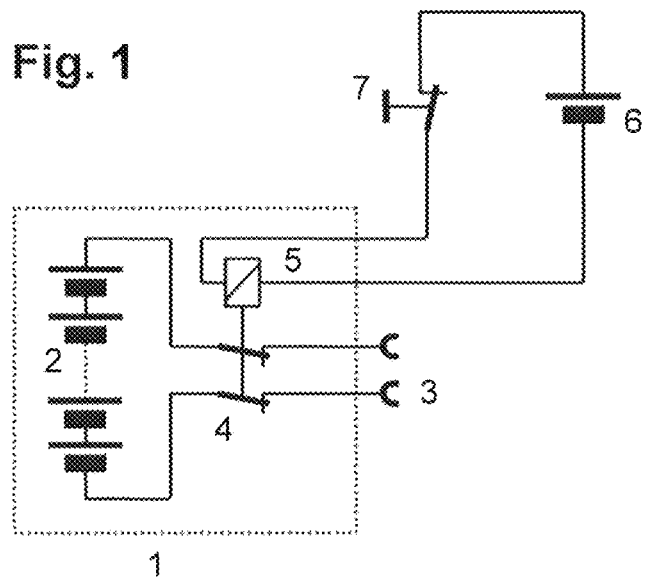
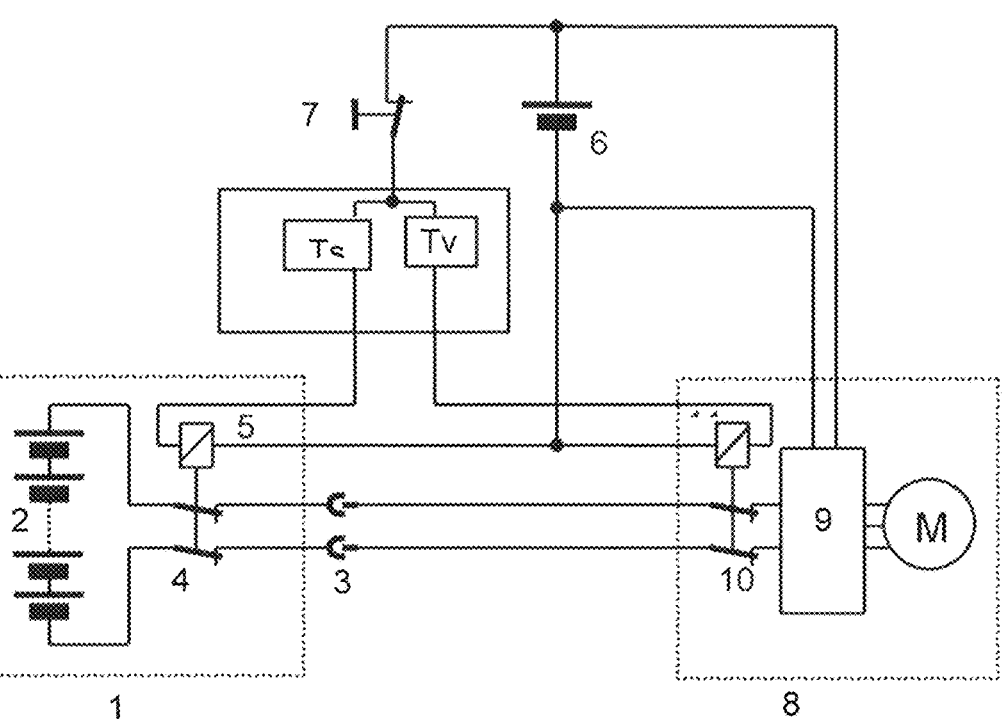
Fig. 2

ELECTRIC DRIVE AND EMERGENCY STOP SWITCH FOR BOATS

This application is a continuation of U.S. application Ser. No. 14/442,062 filed May 11, 2015, which claims the priority of International Application No. PCT/EP2013/003393, filed Nov. 11, 2013, and German Patent Document No. 10 2012 021 996.2, filed Nov. 12, 2012, the disclosures of which are expressly incorporated by reference herein.

BACKGROUND AND SUMMARY OF THE INVENTION

The invention relates to a boat with an electric drive and an electrical store which has at least one storage element and a positive and a negative pole, wherein the poles are in current-conducting connection with the storage element and wherein an isolating means for isolating the current-conducting connection between at least one of the poles and the storage element is provided. The invention also relates to a method for isolating an electrical consumer from an electrical store, wherein the electrical store has at least one storage element and a positive and a negative pole, and wherein the poles are in current-conducting connection with the storage element and the electrical consumer is connected to the poles.

In the event of danger or to avoid danger, it is sometimes necessary to quickly and reliably disconnect the electrical components and electrical consumers found on a boat. This is the case, in particular, if the electrical components are connected to a high-voltage source. This applies, in particular, to electrical consumers on a boat.

Therefore, the problem addressed by the present invention is to quickly and reliably isolate an electrical consumer found on a boat from the voltage source.

This problem is solved by a boat with an electric drive and an electrical store, wherein the electrical store has at least one storage element and a positive and a negative pole, wherein the poles are in current-conducting connection with the storage element and wherein an isolating means for isolating the current-conducting connection between at least one of the poles and the storage element is provided, and which boat is characterized in that an emergency stop switch, which is directly activatable by the user of the boat and is operatively connected to the isolating means, is provided.

A method according to the invention of the type mentioned at the outset is distinguished in that the current-conducting connection between the storage element and at least one of the poles is interrupted by means of an emergency stop switch.

By activation of the emergency stop switch, the current-conducting connection between the poles and the storage element is directly isolated by the user of the boat. In this way, all of the electrical consumers connected to the poles are quickly and reliably disconnected. This is important, in particular, for electrical consumers on a boat, since certain hazardous conditions prevail there owing to the wet environment and the ever-humid conditions.

According to the invention, the emergency stop switch acts directly on the electrical store and switches the poles of the store to be isolated from the supply. Hence, all of the electrical components connected to the electrical store are cut off from the voltage supply. In an embodiment, the isolating means is electrically activated. When the emergency stop switch is activated, the electrical supply of the isolating means is interrupted, with the result that the isolating means isolates the poles of the electrical store from the storage element or elements.

The invention is particularly advantageous if the electrical store is embodied as a high-voltage source. The term "high-voltage source" is intended to refer, in particular, to voltage sources with a terminal voltage of more than 60 volts, more than 100 volts or more than 200 volts.

The emergency stop switch is preferably arranged in or on the boat such that it can be activated immediately by the user in the event of danger. In the case of an outboard drive, it is particularly advantageous to provide the emergency stop switch on the housing of the outboard drive or on the tiller of the outboard drive. If the user is controlling the outboard drive using a tiller, said user is always in the immediate vicinity of the emergency stop switch and can thus very quickly activate the emergency stop switch if necessary. Alternatively, the emergency stop switch can also be accommodated in a remote controller or provided with a remote controller.

During the service life of the electric drive, repeated activation of the emergency stop switch may be necessary. The emergency stop switch and the isolating means must therefore also function properly in the case of repeated activation.

Switching an electrical isolating means under load represents an increased loading and the isolating means must be configured appropriately. The installation size of the isolating means and the costs increase when repeated disconnection under load is required.

For this reason, it is advantageous if the load is first reduced and then the isolating means is opened. Therefore, isolating elements for isolating the current-conducting connection between the respective consumer and at least one of the poles are advantageously provided for one or more of the electrical consumers. Said isolating elements for isolating the current-conducting connection between the respective consumer and at least one of the poles are operatively connected to the emergency stop switch.

The isolating means for interrupting the current-conducting connection between the storage element and at least one of the poles and the isolating element or elements for isolating the current-conducting connection between the respective consumer and at least one of the poles are therefore activated in a staggered manner over time in order firstly to reduce the load before the isolating means switches the pole or poles to be isolated from the supply.

By way of example, this may occur by temporally staggered actuation of the signal receivers by an emergency stop controller. That is to say that, when the emergency stop switch is activated, temporally offset signals are transmitted to the isolating elements and the isolating means, with the result that the isolating elements and the isolating means are switched at different instants.

In another embodiment, the isolating means and the isolating elements substantially simultaneously receive a signal from the emergency stop switch. The isolating elements and the isolating means have or are connected to control units which each have an internal delay and rearrange the switching commands into the desired sequence.

Provided an electrical consumer connected to the poles of the electrical store has an electronic controller, it is likewise possible to directly affect the electronic control of the consumer and to switch the consumer off in the event of activation of the emergency stop switch.

The use of the above-described temporal delay when the emergency stop switch is activated can reduce the reliability of the emergency stop circuit. For reasons of safety, it is therefore advantageous to additionally bring the emergency stop switch into operative connection with the voltage supply of the control units of the electrical consumers and/or of the isolating means and/or of the isolating elements, provided said control units and voltage supplies are provided. After the emergency stop switch has been activated, not only is the isolating means for interrupting the current-conducting connection between the storage element and at least one of the poles and optionally the isolating elements for interrupting the electrical connection between the consumer and the poles activated, but also the control units of the consumers, the isolating elements and/or the isolating means are switched to be isolated from the supply.

In a variant of the above embodiment, after the emergency stop switch has been activated, first the isolating elements and the isolating means are switched and the respective current-conducting connections isolated, before the control units of the consumers, the isolating elements and/or the isolating means are isolated from their voltage supplies.

The interruption of the voltage supply of the control units is somewhat temporally delayed compared with the controlled disconnection, that is to say the activation of the isolating elements and/or the isolating means. The temporal delay is advantageously ensured by the use of a further storage element for providing the supply voltage, wherein the further storage element has a defined energy content. Said further storage element may be formed, for example, from capacitors or batteries with a defined energy content. Once this energy has been consumed, the control units are also isolated from the voltage source, with the result that the consumers are safely disconnected.

Owing to the described staggering of the switching of the isolating elements, the isolating means and/or the voltage supplies of the control units of the consumers, the isolating elements and/or the isolating means, the demands on the electrical stores, the consumers and the isolating elements and the isolating means are minimized. The delay between switching the isolating elements, opening the isolating means and disconnecting the supply voltage of the isolating means or the consumers may be, for example, smaller than 100 ms.

The temporal delay of the interruption of the electrical supply of the control units of the consumers or the supply of the control unit of the isolating means is done, for example, by means of a control store with defined energy content, for instance a capacitor or a battery.

The emergency stop switch is preferably embodied as a solenoid switch with magnetic principle of operation. This applies, in particular, to a boat with an outboard drive. The outboard drive is usually embodied with a watertight housing. By using a solenoid switch, a cable bushing from the emergency stop switch, which is mounted outside of the housing of the outboard drive, to the inside of the housing is avoided. The watertightness of the housing remains ensured and is not negatively influenced by the emergency stop switch.

By way of example, a control unit is provided in the housing of the outboard drive, which control unit reacts to a magnetic field which is influenced or disturbed by the activation of the emergency stop switch. The control unit is then operatively connected to the isolating means and optionally to further isolating elements or other control units.

For this purpose, the emergency stop switch is provided, for example, with a permanent magnet. When the emergency stop switch is activated, the permanent magnet is set in a position, provided for this purpose, of the housing of the outboard drive. A sensor unit within the housing, in particular within a watertight housing, then detects that the emergency stop switch has been activated. The sensor unit may comprise, for example, a component made from a magnetically soft material which is attracted by the permanent magnet when the emergency stop switch is activated and the permanent magnet is set. Conversely, it is also possible that the permanent magnet is located inside the watertight housing and the magnetically soft component is an element of the emergency stop switch.

In another variant, a magnetic field is generated by activation of the emergency stop switch, which magnetic field acts on a control unit. Said modifications to the magnetic field or the formation of a magnetic field are ascertained by the control unit, interpreted as a signal for emergency disconnection and passed to the isolating means and/or the isolating elements which then interrupt the current-conducting connection between the storage element of the electrical store and the poles and/or between the consumer and the poles.

In another embodiment of the invention, a magnetic circuit is influenced when the emergency stop switch is activated. By way of example, a magnetic circuit is maintained inside the housing of an outboard drive during normal operation. When the emergency stop switch is activated, a magnet is brought from outside into the vicinity of the magnetic circuit and the change in the magnetic circuit which results from the change in the position of the magnet can be detected by a magnetic-field sensor, a Hall element or a Reed contact.

The reliability of the detection of a particular state of the magnetic circuit used for the emergency stop function can be increased by the use of a plurality of magnetic-field sensors, Hall elements or Reed contacts. In this case, the activation of all of the magnetic-field sensors or all of the Reed contacts is necessary in order to connect the poles in a current-conducting manner to the storage element. Conversely, that means that the deactivation of one sensor or one contact is sufficient to interrupt the current-conducting connection between the storage element and the poles and to switch into the emergency stop state.

The signals of the sensors are connected by logic such that the isolating means of the store only produces a current-conducting connection between the storage element and the poles if all of the sensors detect the correct state, that is to say non-activation of the emergency stop switch. As soon as one of the sensors detects activation of the emergency stop switch, the isolating means is actuated and the current-conducting connection is interrupted In the case of an outboard drive, the tiller is used to control the direction and speed of the propulsion and to relay particular setpoint values to the control unit of the motor. The control unit then forwards corresponding control signals to the electric drive or electric motor in order to make it, for example, rotate more slowly or more quickly.

In the case of an outboard drive with an electric motor, a tiller and a control unit, there exists the danger that water or moisture enters the control unit via the connection between the tiller and the control unit and damages the sensitive electronics. Preferably, in the case of such an outboard drive, the tiller and control unit are coupled magnetically with respect to the signals transmitted is magnetic.

The tiller is equipped, for example, with a magnet which can change its position. This change in position can be effected, for example, by the magnet being integrated in a twist grip. The control unit for controlling the motor is operatively connected to a sensor for detecting the magnetic field of the magnet and hence for determining the position of the magnet. The control unit interprets the position of the magnet as a particular setpoint value for the control of the motor and transmits corresponding signals to the electric motor. In addition, the magnet is used to activate the emergency stop function. If the magnet is removed from its position, this is detected by the sensor, passed to the control unit and interpreted as a signal to introduce the emergency stop, that is to say the current-conducting connection between the storage element and at least one of the poles is interrupted.

The invention and further advantageous configurations of the invention are schematically illustrated in the drawings.

BRIEF DESCRIPTION OF THE DRAWINGS

FIG. 1 schematically shows a circuit according to the invention,

FIGS. 2 to 4 show alternative embodiments of the invention,

DETAILED DESCRIPTION OF THE DRAWINGS

Figure 3:
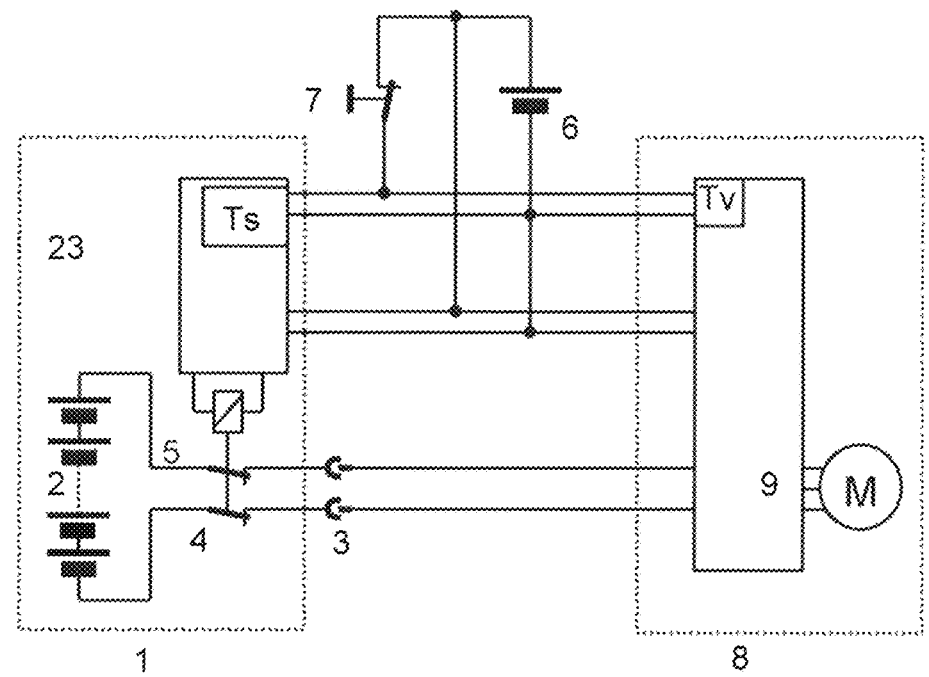

FIG. 1 schematically shows a lithium-ion battery 1 with an emergency stop circuit according to the invention. The lithium-ion battery 1 is used, for example, on a boat as electrical store for voltage supply of an electric motor—not shown—for driving the boat and is embodied as a high-voltage battery.

The lithium-ion battery 1 has a multiplicity of battery cells 2 or, generally, storage elements 2 which are connected in series and/or in parallel with one another. The battery cells 2 are connected to two battery poles 3 to which the electrical consumer or consumers, for example the electric drive of the boat, can be connected.

Switches 4 are provided between the battery cells 2 and the battery poles 3, using which switches the current-conducting connection between the battery cells 2 and the battery poles 3 can be produced or interrupted. The switches 4 are actuated via a relay 5. The relay 5 is supplied with current from a low-voltage battery 6 with a terminal voltage of, for example, 12 V. An emergency stop switch 7 is connected in the circuit containing the battery 6 and the relay 5.

While the relay 5 is supplied with current from the battery 6, the switches 4 remain closed and the battery poles 3 are connected to the battery cells 2. If, in the event of an emergency, the emergency stop switch 7 is activated by a user of the boat, the circuit containing the battery 6 and the relay 5 is interrupted and the relay 5 is isolated from the battery 6. This results in the switches 4 automatically opening and the battery poles 2 being switched to be isolated from the supply. Hence, all of the consumers connected to the battery poles 3 are also disconnected.

FIG. 2 shows another embodiment of the invention. Identical components are provided with identical reference signs in all the figures.

The battery poles 3 can in turn be isolated from the battery cells 2 by means of the switches 4. The switches 4 are actuated via the relay 5. A central emergency stop control unit 22 with a time-delay member Ts and a time-delay member Tv is now provided in the circuit composed of low-voltage battery 6, emergency stop switch 7 and relay 5.

When the emergency stop switch 7 is activated, the time-delay member Ts interrupts the flow of current or the voltage supply of the relay 5 with a short delay of, for example, 100 ms compared to the interruption of the voltage supply of the relay 11. The time-delay members Ts and Tv are embodied, for example, as capacitors.

An electric drive 8 is connected to the battery pole 3. The electric drive 8 comprises an electric motor M and a motor controller 9. The motor controller 9 is supplied from the low-voltage battery 6. Power is supplied to the electric motor M from the lithium-ion battery 1 and can be interrupted by means of switches 10 in the connection lines between the battery poles 3 and the electric motor M. The switches 10 are connected via a relay 11.

The relay 11 is connected in series with the low-voltage battery 6, the emergency stop switch 7 and the time-delay member Tv. When the emergency stop switch 7 is activated, the time-delay member Tv interrupts the flow of current or the voltage supply of the relay 11 with an adjustable time delay.

When the emergency stop switch 7 is opened, the relay 5 and the relay 11 are isolated from the low-voltage battery 6 with the time delays which can be adjusted via the time-delay member Ts and the time-delay member Tv. The time delays of the time-delay members Ts and Tv are preferably adjusted such that, after the emergency stop switch 7 is opened, first the relay 11 is isolated from the voltage supply 6 and the switch 10 is opened. Then, the relay 5 is switched to be isolated from the supply, with the result that the switches 4 also open and the battery poles 3 of the battery cells 2 are electrically isolated.

In the embodiment according to FIG. 2, first the individual consumers, in this case the electric motor M, are isolated from the battery poles 3 before the battery poles 3 are isolated from the battery cells 2. In this way, the loading of the switches 4 for isolating the battery poles 3 from the battery cells 2 is reduced.

FIG. 3 shows another embodiment of the invention. In contrast to the embodiment according to FIG. 2, in this case no central emergency stop control unit is provided, but rather separate control units 23, 9 for the lithium-ion battery 1 and the electric motor M. The control unit 23 for the lithium-ion battery 1 is provided with a time-delay member Ts; the motor controller 9 has a time-delay member Tv. Once the emergency stop switch 7 has been activated, the flow of current to the time-delay member Ts and to the time-delay member Tv is simultaneously interrupted. The control unit 23 and the motor controller 9 are still connected to the low-voltage battery 6, however.

The activation of the emergency stop switch 7 activates the time-delay members Ts and Tv, which subsequently act with the adjusted or provided time constants on the control unit 23 or the motor controller 9. The temporal delay between the switch-off of the electric motor M and the opening of the switches 4 therefore takes place peripherally by means of the time-delay members Ts and Tv in the control unit 23 and in the motor controller 9. The time constant of the time-delay member Tv is smaller than that of the time-delay member Ts, with the result that first the electric motor M is disconnected via the motor controller 9 and then the switches 4 are opened via the relay 5 and the battery poles 3 are isolated from the battery cells 2.

Figure 4:
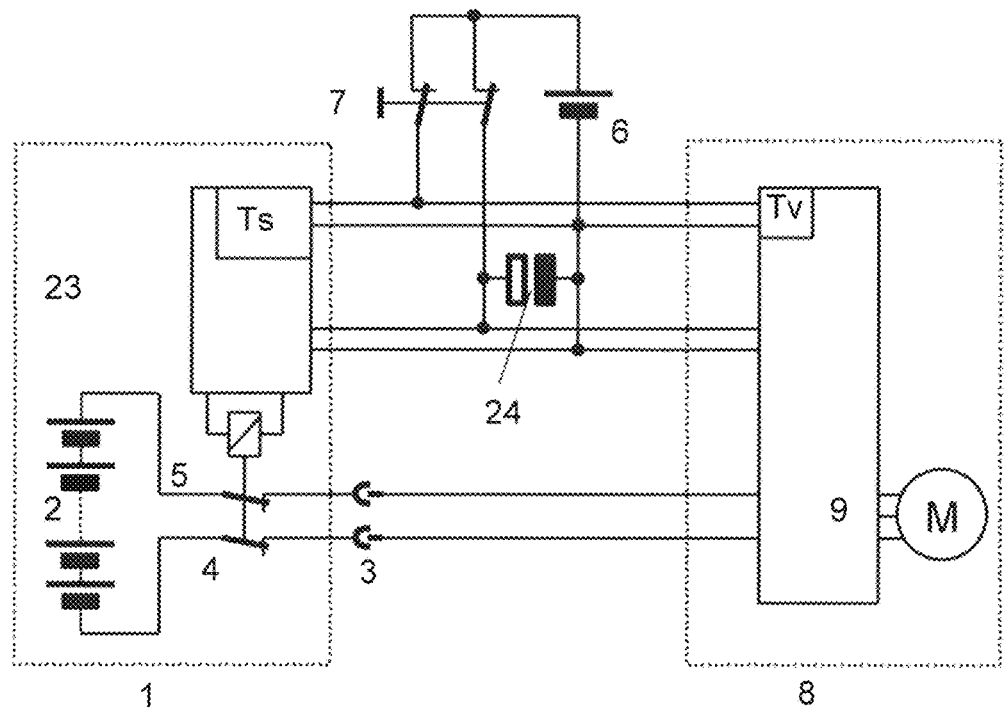

FIG. 4 shows a variant of the embodiment from FIG. 3, which contains an additional safety feature. In this case, a capacitor 24 as energy buffer is provided in the power supply for the control unit 23 and for the motor controller 9. As in the case of the embodiment according to FIG. 3, when the emergency stop switch 7 is activated, the time-delay members Ts and Tv are isolated from the low-voltage battery 6 and the electric motor M is disconnected with the corresponding time delay and the switches 4 are opened with the corresponding time delay in order to isolate the battery poles 3 from the battery cells 2.

In contrast to FIG. 3, when the emergency stop switch 7 is activated, the control unit 23 and the motor controller 9 are also isolated from the low-voltage battery 6. The control unit 23 and the motor controller 9 are still connected to the capacitor 24, however. The capacitor 24 ensures the power supply of the motor controller 9 and the control unit 23 until the electric motor M is disconnected and the switches 4 are opened. After the capacitor 24 has discharged, the control unit 23 and the motor controller 9 are also isolated from the supply.

Hence, what is ensured in the embodiment according to FIG. 4 is that even in the unlikely event that the control unit 23 or the motor controller 9 are not functioning properly when the emergency stop switch 7 is activated, the control unit 23 and the motor controller 9 are isolated from the supply once the capacitor 24 has discharged and, accordingly, the electric motor M is disconnected and the battery poles 3 are isolated from the battery cells 2.

Figure 5:
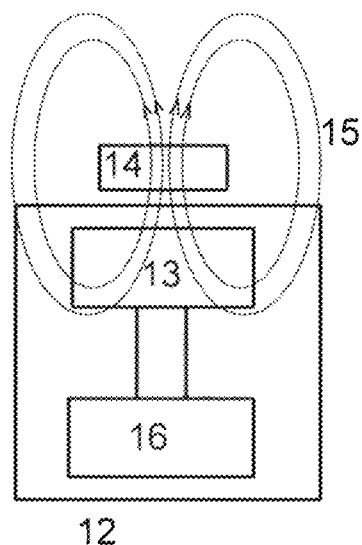
FIGS. 5 and 6 show variants of the invention, in which the emergency stop function is magnetically activated.

FIG. 5 shows another variant of the invention, which can be used, for example, in the case of an electric outboard drive of a boat. In this example, a control unit 13 is provided in the housing 12 of the outboard drive, which control unit 13 reacts to a magnetic field which is influenced or disturbed by the activation of the emergency stop switch. When the emergency stop switch is activated, a magnet 14 is brought into the vicinity of the control unit 13. The magnetic field 15 of the magnet 14 disturbs the control unit 13 and signals to the latter that the switches 4 should be opened via an emergency stop controller 16 to interrupt the electrical connection between the battery cells 2 and the battery poles 3. Of course, this embodiment may be combined with any of the exemplary embodiments according to FIGS. 1 to 4.

It is also possible, by activating the emergency stop switch, to induce a magnetic field. These changes or formation of a magnetic field are determined by the control unit, interpreted as emergency disconnection signal and passed to the switches 4 which then interrupt the current-conducting connection between the battery cells 2 and the battery poles 3.

Figure 6:
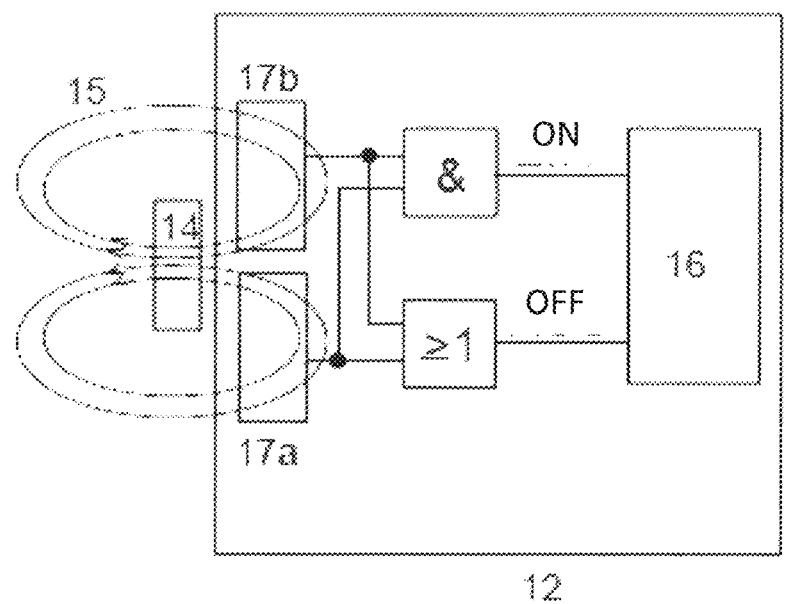

FIG. 6 shows a variant of the embodiment from FIG. 5. In this case, two sensors 17a, 17b are provided, which can detect the presence of the magnetic field 15 of the magnet 14. The two sensors 17a, 17b are logically interconnected such that the emergency stop controller 16 is deactivated only if neither of the sensors 17a, 17b registers a magnetic field. In this case, the switches 4 remain closed and the battery poles 3 are connected to the battery cells 2. As soon as one or both of the sensors 17a, 17b detect(s) the magnetic field 15, the emergency stop controller is activated and the battery poles 3 are switched to be isolated from the supply.

In the case of an outboard drive, the tiller is used to control the direction and speed of the propulsion. For this purpose, a particular setpoint speed or a particular propulsion is predefined, for example, by means of an accelerator throttle located on the tiller. Said setpoint value is transmitted to the control unit and passed to the electric drive or electric motor via control signals in order to cause said electric drive or electric motor to rotate more slowly or more quickly.

In the case of an outboard drive having an electric motor, a tiller and a control unit, there exists the danger that water or moisture enters the control unit via the connection between the tiller and the control unit and damages the sensitive electronics. Preferably, in the case of such an outboard drive, the tiller and control unit are coupled magnetically with respect to the signals transmitted between them.

Figure 7:
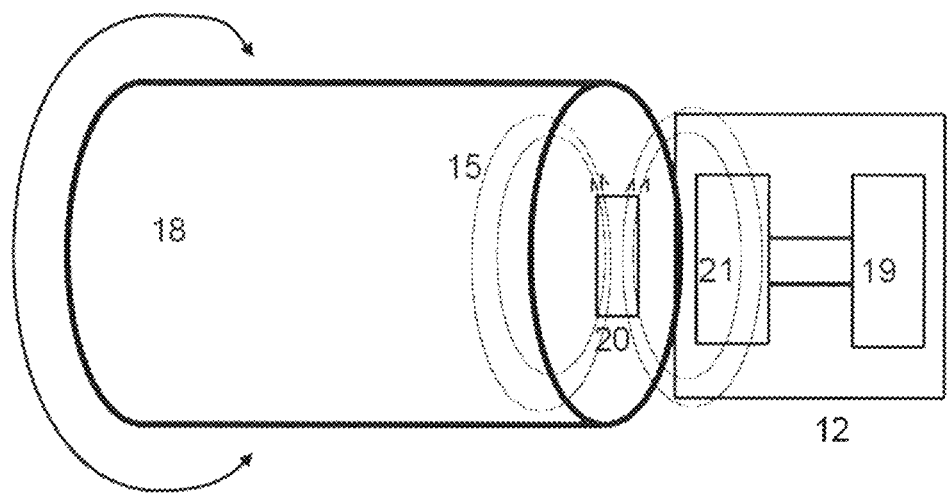
FIG. 7 shows a variant, in which the emergency stop function can be activated via the tiller of an outboard drive.

An embodiment of this type is illustrated in FIG. 7. The control unit 19 is arranged in a housing 12 and embodied to be watertight. The signal transmission between the tiller 18 and the control unit 19 takes place electromagnetically, as a result of which a cable bushing from the tiller 18 to the control unit 19 within the housing 12 is avoided. The watertightness of the housing 12 remains guaranteed, therefore, and is not negatively influenced by the connection of tiller 18 and control unit 19. For this purpose, tiller and control unit are equipped, for example, with a magnet 20 and a corresponding receiver 21 which ensure the signal transmission.

The magnet 20 has a dual function: the magnet 20 rotates with the twist grip 18 of the tiller and transmits its position via the sensor 21 to the control unit 19. Setpoint speed and propulsion are thus transmitted via the twist grip 18 to the control unit 19. In addition, by removing the magnet 20, the emergency stop function is activated. In this case, the emergency stop switch is embodied such that, when it is activated, the magnet 20 is removed from its position with respect to the sensor 21. The control unit 19 interprets the disappearance or absence of the magnetic field 15 as an emergency stop situation and introduces the appropriate steps, in particular the isolation of the battery poles from the battery cells.

What is claimed is:

1. An outboard motor assembly for a boat, the outboard motor assembly comprising:
   an electric motor for propelling the boat;
   a battery coupled to the electric motor, the battery including:
      positive and negative poles in current-conducting connection with a battery cell;
      a user activatable emergency stop switch, including a magnet and a magnetic field sensing sensor, the emergency stop switch activating when the sensor senses a magnetic field change caused by the magnet; and
      an isolating circuit element operatively connected to the emergency stop switch, and configured to, upon activation of the emergency stop switch, isolate the current-conducting connection between at least one of the poles and the battery cell.

2. The outboard motor assembly of claim 1, wherein the battery comprises a high-voltage source having a terminal voltage of more than 60 volts.

3. The outboard motor assembly of claim 1,
   wherein the emergency stop switch is positioned on one or more of a housing and a tiller of the outboard motor assembly.

4. The outboard motor assembly of claim 1, further comprising:
   one or more electrical consumers in respective current-conducting connection with the poles of the battery; and
   one or more additional isolating circuit elements operatively connected to the emergency stop switch, and configured to, upon activation of the emergency stop switch, isolate the respective current-conducting connection between the one or more electrical consumers and at least one of the poles.

5. The outboard motor assembly of claim 1, wherein the isolating circuit element further includes a time delay unit.

6. The outboard motor assembly of claim 1, further comprising:
an electrical consumer in current-conducting connection with the poles of the battery, the electrical consumer including a dedicated control unit operatively connected to the emergency stop switch.

7. The outboard motor assembly of claim 1, further comprising:
an electrical consumer in current-conducting connection with the poles of the electrical store, the electrical consumer including a dedicated control unit operatively connected to a dedicated voltage supply, the dedicated voltage supply in turn operatively connected to the emergency stop switch.

8. The outboard motor assembly of claim 1, wherein the emergency stop switch is a solenoid switch.

9. The outboard motor assembly of claim 1, further comprising a plurality of sensors configured to detect activation of the emergency stop switch.

10. An emergency stop system for an outboard motor of a boat, comprising:
a user activatable stop switch, including a user-displaceable magnet positioned on a housing of the outboard motor, and a magnetic field sensing sensor that activates the stop switch upon sensing a magnetic field change caused by displacement of the magnet; and
an isolating circuit element operatively connected to the stop switch, and configured to, upon activation of the stop switch, isolate a current-conducting connection between: (a) a cell of a battery of the outboard motor, and (b) at least one electrical pole of the battery, the at least one electrical pole being in the current-conducting connection with the cell.

11. The emergency stop system of claim 10, wherein the battery comprises a high-voltage source having a terminal voltage of more than 60 volts.

12. The emergency stop system of claim 10, further comprising:
one or more additional isolating circuit elements operatively connected to the stop switch, and configured to, upon activation of the stop switch, isolate respective current-conducting connections between one or more electrical consumers and at least one of the poles.

13. The emergency stop system of claim 10, wherein the isolating circuit element further includes a time delay unit.

14. The emergency stop system of claim 10, further comprising:
a dedicated voltage supply operatively connected to the stop switch and to an electrical consumer in current-conducting connection with the poles of the battery, the electrical consumer including a dedicated control unit operatively connected to the dedicated voltage supply.

15. The emergency stop system of claim 10, wherein the stop switch is a solenoid switch.

16. The emergency stop system of claim 10, further comprising a plurality of sensors configured to detect activation of the stop switch.

* * * * *